Nov. 18, 1969  F. A. NORRIS  3,479,536
PIEZOELECTRIC FORCE TRANSDUCER
Filed March 14, 1967  3 Sheets-Sheet 1
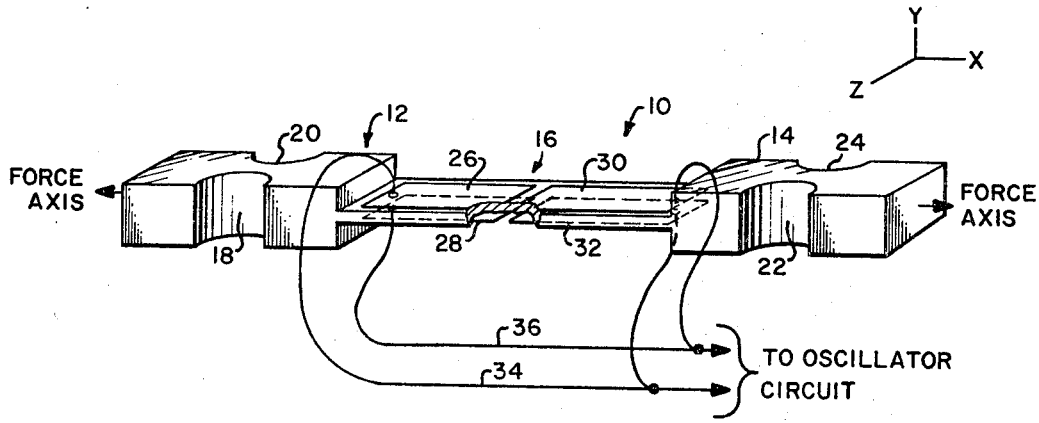
FIG.1
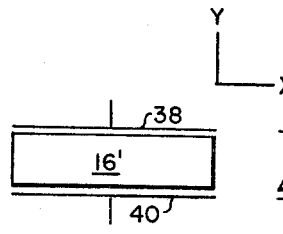
FIG.2   FIG.3   FIG.4
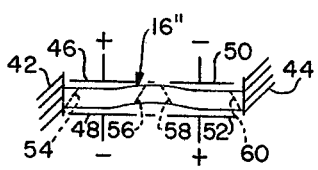    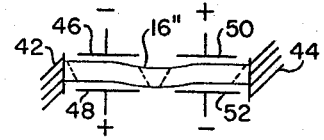
FIG.5   FIG.6
INVENTOR.
FRANK A. NORRIS
BY Karl A. O'Kralik
ATTORNEY Nov. 18, 1969  F. A. NORRIS  3,479,536
PIEZOELECTRIC FORCE TRANSDUCER
Filed March 14, 1967  3 Sheets-Sheet 2

INVENTOR.
FRANK A. NORRIS

BY *Karl A. O'Kralik*

ATTORNEY

Nov. 18, 1969  F. A. NORRIS  3,479,536
PIEZOELECTRIC FORCE TRANSDUCER
Filed March 14, 1967  3 Sheets-Sheet 3
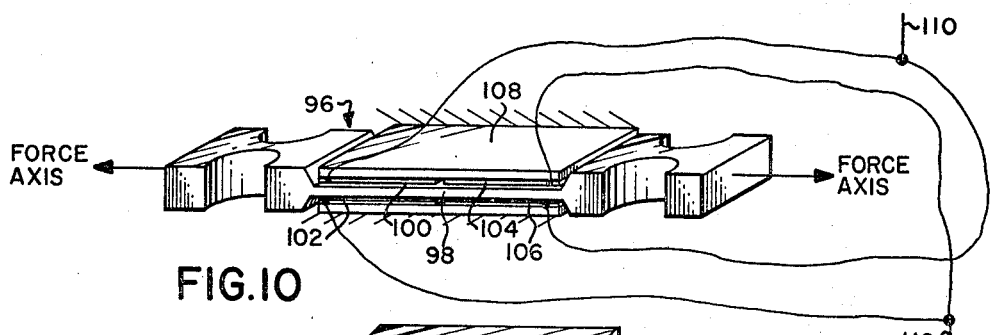
FIG.10
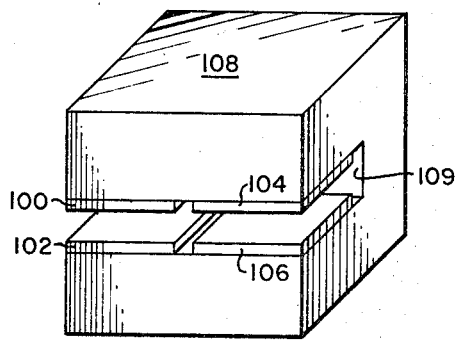
FIG.11
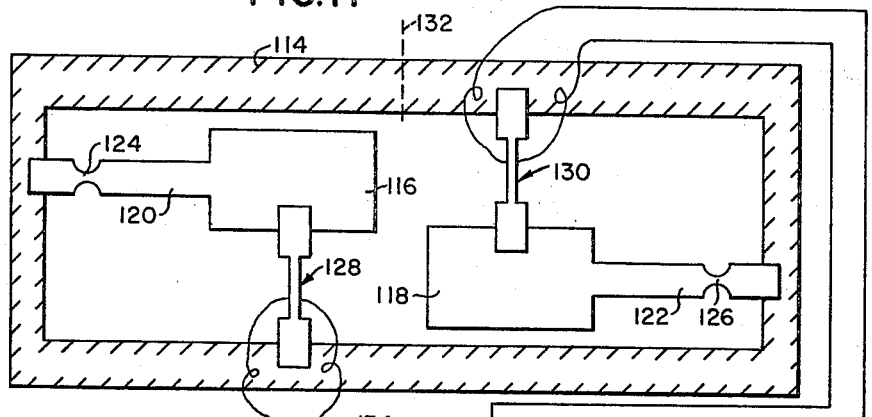
FIG.12
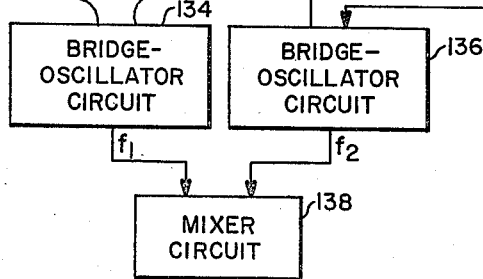
INVENTOR.
FRANK A. NORRIS
BY Karl A. Ohralik
ATTORNEY United States Patent Office 3,479,536
Patented Nov. 18, 1969

3,479,536
PIEZOELECTRIC FORCE TRANSDUCER
Frank A. Norris, Franklin Lakes, N.J., assignor to Singer-General Precision, Inc., a corporation of Delaware
Filed Mar. 14, 1967, Ser. No. 622,988
Int. Cl. H04r 17/10
U.S. Cl. 310—8.5                              11 Claims

ABSTRACT OF THE DISCLOSURE

A force transducer, adaptable for use in accelerometers and the like instruments, comprises a thin, elongated, piezoelectric, vibratory beam member mounted to receive compressive and tensile forces along its length and which affect its natural frequency of vibration. To drive the beam, longitudinally spaced, oppositely directed, alternating electric fields are impressed across the beam along the thickness thereof and these fields are produced by pairs of electrodes placed on opposite sides of the beam and electrically excited to produce oppositely directed electric fields through the beam. The beam is oriented crystallographically so that such fields cause oppositely directed body shear strains, causing bending of the beam. Such electrical excitation at any frequency causes vibration of the beam at the same frequency.

By exciting the beam with an electrical oscillator, the oscillator "follows" the instantaneous nautral frequency of vibration of the beam and thus, the output of the oscillator is a digital representation of axial force applied to the beam.

Two transducers as described may be mounted in a push-pull arrangement in an accelerometer whereby an acceleration impresses tension in one beam and compression in the other. The difference frequency of the oscillators driving such beams is a nearly linear output of the force of acceleration.

BACKGROUND OF THE INVENTION

This invention relates to sensing devices and more particularly to force sensing transducers responsive to tensile and compressive forces to produce digital outputs corresponding to the type and intensity of applied force.

Force transducers have wide application in many instruments and apparatus, such as accelerometers, pressure gauges, and the like and many different force transducers have been heretofore devised. Many of these transducers of the vibratory type have been satisfactory and suitable for the purposes intended, however, the refinements and technological advancements in the apparatus in which the force transducers are employed, impose ever more stringent requirements on structural and functional characteristics of the transducers. Accordingly, better long-term stability, freedom from stray fields and higher Q, that is, the ratio of energy stored in the vibratory beam to the energy loss, are desired factors. Inasmuch as such transducers are frequently employed in apparatus which is necessarily of minimum weight, size and of electrical power requirements, it is therefore also desired that these advantages be achieved without concomitant sacrifice in size, weight and power requirements and, if possible, to even reduce these latter mentioned factors.

Also, because of the advantages and widespread use of digital type information processing circuitry and apparatus to which force transducers frequently supply information, certain inherent advantages exist in force transducers which convert force intensity directly into a digital output signal which is indicative of both the direction and intensity of the force. Force transducers providing such direct, digital outputs have been devised. These have included vibratory strings and tapes of various materials such as metal or quartz. One of the more significant deficiencies of these prior art transducers is the requirement of prestressing the vibratory string or tape so as to accommodate and sense compressive forces. That is, since an unstressed string or tape will buckle under a compressive force, to accommodate such compressive forces, the string or tape must be initially placed and maintained in tension. Thus, as compressive forces are applied to such pre-tensed member, the tension thereof is decreased and such decrement is a measure of the compression force. Accordingly, the intensity of the initial tensile force must be greater than any compressive force which the member is to sense and effectively measure. As can be readily understood, such continuous tension on the vibratory member in due course causes elongation of the vibration member resulting in errors in measurements.

This deficiency in vibratory members has been rather successfully solved by the provision of vibratory metal beams which do not require pre-stressing in tension and are capable of sensing both compressive and tensile forces from an initial unstressed condition. These beams in force transducers have given very satisfactory results in many respects but because of the natural advantages of materials such as quartz, with its long-term stability, high Q, insusceptibility to stray fields, high resilience and other factors, over metals of even the most superior types, vibratory quartz beams have given promise of even better functional results. For improved vibratory beams then, it remained to provide accompanying apparatus and devices to establish and maintain vibration in the beam at its natural frequency, to sense its vibration rate and to provide a digital output varying linearly with the force input. In view of the environments of these apparatus and other imposed requirements, the associated circuitry and other components are necessarily simple, small and light, as well as effective in producing the desired results.

Accordingly, it is a principal object of this invention to provide novel means for exciting and driving a vibratory piezoelectric beam.

It is another object of this invention to facilitate the sensing and measuring of tensile and compressive forces by simple, light, and small means having long-term stability, high Q and low susceptibility to stray fields.

It is another object of this invention to facilitate the sensing and measuring of tensile and compressive forces by means having a linear response.

SUMMARY OF THE INVENTION

In accordance with this invention, a force transducer includes a piezoelectric beam, being disposed to receive tensile and compressive forces along its length and having provision for establishing alternating, instantaneously oppositely directed, electric fields transversely through the beam at longitudinally spaced locations.

The crystallographic axes of the beam are so oriented that the effect of the fields is to produce a body shear in the beam. The internal stress is longitudinally directed and increases uniformly from the beam's neutral axis to maximum tensile stress at one surface and maximum compressive stress at the opposite surface, causing the beam to bend.

The alternations of the fields are synchronized and the frequency thereof made equal to the natural frequency of vibration of the beam.

A simple, effective means for establishing the fields includes conductive electrodes, which may be a thin layer of vapor deposited gold, platinum, aluminium or other suitable conductive material, applied directly to the opposed surfaces of the beam. Appropriate electrical excitation of each pair of electrodes may be from a bridge oscillator.

DESCRIPTION OF THE DRAWINGS

FIGURE 1 is a perspective view of a digital force transducer according to this invention, FIGURES 2, 3 and 4 are pictorial aids in explaining and understanding the present invention and illustrated the reaction of a piezoelectric member as subjected to an electric field as occurs in the present invention.

FIGURES 5 and 6 are also pictorial aids in explaining and understanding the operation of the present invention and illustrate a piezoelectric member when subjected to a pair of oppositely directed longitudinally separated electric fields, FIGURE 10 is a perspective view of a digital force transducer according to still another embodiment of this invention, FIGURE 11 is an enlarged, perspective view of the electric field producing structure of FIGURE 10, FIGURE 12 includes a cut-away section of an accelerometer utilizing a pair of digital force transducers according to this invention and also illustrating electrical circuitry co-operative with the accelerometer unit for producing a digital output signal representative of acceleration of the accelerometer unit.

DESCRIPTION OF THE PREFERRED EMBODIMENTS

Figure 7:
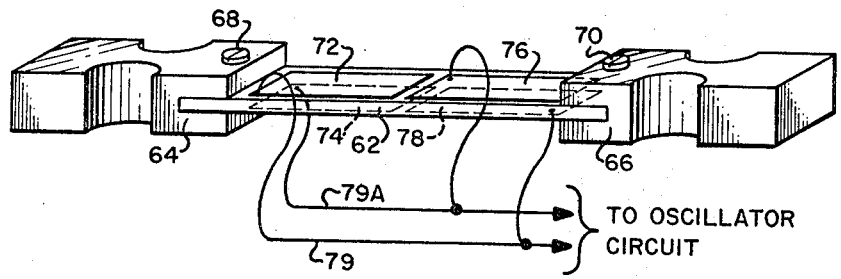
FIGURE 7 is a perspective view of another embodiment of a digital force transducer according to this invention.

In FIGURE 1, 10 represents generally the digital force transducer comprising an integral element having a pair of end termination portions 12 and 14 and a thin vibratory beam portion 16. The member 10 is formed of a suitable piezoelectric material such as quartz. Various other piezoelectric materials are known and would be suitable as member 10 herein, however, for purposes of simplicity, the invention will be described wherein member 10 is made of quartz only. In the case of a quartz material, the vibratory portion 16 forms a full or rotated Y cut crystal in which the dominant mode is excited by the body shear mechanism. In a full Y cut crystal the X, Y, and Z axes of the crystal may be as shown in this figure.

The end termination portions 12 and 14 are preferably of such configuration and dimensions as to facilitate the longitudinal mounting of the member 10 so as to apply axial forces of compression or tension thereto. To isolate the vibratory beam 16 from forces not axially aligned, the end termination 12 is provided with a pair of recesses 18 and 20 and the end termination 14 is provided with similar recesses 22 and 24, the respective recesses forming effective hinges in the end termination sections.

In accordance with an important feature of this invention, the beam 16 is provided with sets of electrodes. One electrode of a set is shown at 26 and another electrode of the set 28, is disposed on the side of the beam 16 opposite to the electrode 26 and is similarly constructed and arranged so as to be coextensive with a projection of electrode 26. Longitudinally disposed from the set 26–28 is a second set of electrodes 30 and 32, preferably of substantially the same size and construction as the electrodes 26 and 28 and wherein electrode 32 is coextensive with a projection of electrode 30. The electrodes 26 through 32 may be formed of any suitable conductive material. Vapor deposition of gold, aluminium, platinum and other materials have been found satisfactory and in general the electrodes preferably cover substantially the entire surface area of a length of the beam 16. Also, in general, it is preferable that the electrodes be as thin and light as possible, however, this is not an absolute necessity inasmuch as the thickness and weight of the electrodes may be taken into account in the construction of the beam.

The sets of electrodes 26–28 and 30–32 are functional to establish electric fields through the vibratory member 16 at spaced longitudinal locations. To facilitate such application of electric fields, each of the plates of each set is connected to one of the electrical lines 34 or 36 which are connected to the output of a suitable electrical oscillator, not shown. Thus, the line 34 is connected to the electrodes 26 and 32 while the line 36 is connected to the electrodes 28 and 30. It should be particularly observed that the line 34 is connected to the upper electrode in the first set and the lower electrode in the other set and the line 36, of course, is connected to the lower electrode of the first set and the upper electrode of the second set whereby the electric fields produced by potentials applied to these electrodes at any instant of time are oppositely directed through the vibratory member 16. It is to be understood that while only two sets of electrodes have been shown and described for producing two electric fields through member 16, three or more sets of electrodes may be provided wherein adjacent sets are oppositely electrically excited producing oppositely directed fields of any instant of time, except of course, as the potential passes through zero. Such excitation, of course, would produce a complex mode of vibration at some multiple of the frequency of the vibration produced as described herein.

The vibratory member 16 being essentially a Y cut crystal has developed therein a shear strain in response to the application of an electric field as indicated. The manner in which the shear strain is effected to produce vibration of the vibratory member may best be appreciated by reference to FIGURES 2 through 6 of the drawings. As illustrated in FIGURE 2, a piezoelectric crystal 16' preferably a Y cut quartz crystal similar to that shown at 16 in FIGURE 1 of the drawing, in its natural state, has a rectangular cross-section as shown and in the absence of any electrical potential difference between the conductive plates 38 and 40. As shown in FIGURE 3 of the drawing, however, the application of a potential difference across the plates 38 and 40 wherein the upper plate as seen in this figure is positive in respect to the lower plate 40, the crystal 16' is subjected to a shear strain whereby its cross-section becomes essentially trapezoidal, as illustrated. Also, as shown in FIGURE 4 of the drawing, a reverse potential difference wherein the lower plate 40 is positive with respect to the upper plate 38, the crystal 16' is subjected to an oppositely directed shear strain and crystal 16' assumes a trapezoidal cross-section wherein, however, the acute and obtuse angles of the trapezoid as seen in FIGURE 3 become conversely obtuse and acute in FIGURE 4. Thus, it is clear that the shear stresses in the crystal 16' are oppositely directed in response to oppositely directed electric fields, as seen in FIGURES 3 and 4.

Referring now to FIGURE 5 of the drawing illustrating a piezoelectric crystal 16" is disposed between a pair of fixed surfaces 42 and 44, and sets of opposed electrodes 46–48, and 50–52. As shown in this figure, electric fields transversely of the crystal 16" are established by the sets of electrodes wherein electrodes 46 and 52 are made positive with respect to respective electrodes 48 and 50, establishing the oppositely directed fields along longitudinal portions of the crystal. In this case, the portion of the crystal between the plates 46 and 48 has a shear stress created therein wherein the crystal tends to assume a trapezoidal cross-section as illustrated by the dotted lines 54 and 56 while the portion of the crystal between the plates 50 and 52 tends to assume a trapezoidal cross-section as illustrated by the lines 58 and 60. The stresses produced by the interaction of the two piezoelectrically induced shear strains are distributed across the beam such that there is a maximum compressive stress at one extreme fiber and a maximum tensile stress at the opposite extreme fiber, both stresses diminishing with distance from the extreme fibers toward the neutral axis at which they are reduced to zero. This is a characteristic of a beam in bending. In response to a reversal of potentials applied to the electrodes 46 through 52 and as seen at FIGURE 6 of the drawings, the crystal 16" becomes bowed in a reverse or upper direction as seen in the figure. It is therefore clear that if the potentials applied to the electrodes are alternated rapidly the crystal similarly will be bowed in opposite directions rapidly or in other words, it will vibrate at the rate of alternation of the applied potentials. Thus, as the lines 34 and 36 coupled to the output circuit of an electronic oscillator, have alternating electrical potentials applied thereto, the beam 16 as seen in this figure may be caused to vibrate at a frequency of such alternation.

As can be understood, the natural frequency of vibration of the crystal 16 is dependent on or is a function of the axial force applied to the member 10. That is, in response to tensile forces applied to the member 10 and thus also to the beam 16, the natural frequency of vibration is increased and conversely, as compressive forces are applied axially to this member the natural frequency of vibration is decreased. The oscillator exciting electrodes 26 to 32 inherently tunes itself to the natural beam vibration frequency and drives it at this frequency. A bridge type oscillator is suitable for this purpose. Thus, the oscillator also provides a digital output corresponding to the analog force applied to the beam.

In accordance with another embodiment of the invention as shown in FIGURE 7 of the drawing, a piezoelectric crystal 62 is supported by and secured to respective end terminations 64 and 66 and may be made separate and distinct from these terminations rather than being integral therewith. In this case, the terminations 64 and 66 need not be of the same material as the crystal 62 but rather may be of any suitable material along which axial tensile or compressive forces may be applied. The crystal 62 may be bonded by any suitable bonding medium, as for example by a quartz to metallic bond in the case that the terminations 64 and 66 are made of metallic material. In addition thereto, suitable screws 68 and 70 may be threaded in the respective members 64 and 66 and terminate in clamping relation to the crystal 62 to aid in securing the same.

The crystal 62 is provided with sets of electrodes 72–74 and 76–78 to which are applied excitation potentials through conductive leads 79 and 79A. It is noted that in this figure of drawings, the separation between the electrodes 72 and 76 is somewhat smaller, however, the amount of separation of such electrodes and the extent of overlap of the electrode on the crystal is a matter of considerable latitude depending upon the desired characteristics of the particular force transducer, taking into account the various properties and the environment in which it is to be operated.

Figure 8:
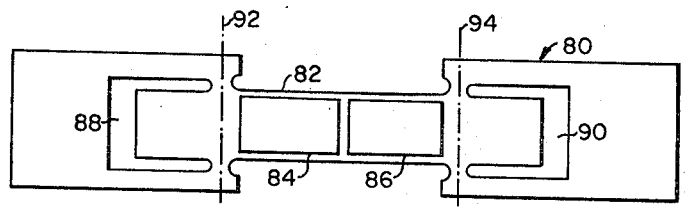
FIGURE 8 is a plan view of a vibrating beam according to another embodiment of this invention.
Figure 9:
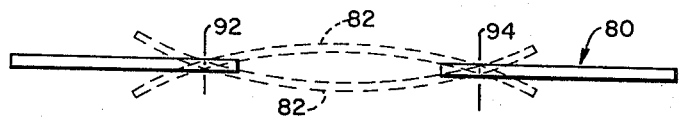
FIGURE 9 is an elevational view of the vibrating beam shown in FIGURE 8 and illustrating the motion of the beam in vibration.

The vibrating beam crystals as shown in FIGURES 1 and 7 of the drawings may be modified and configured in accordance with the beam shown in FIGURES 8 and 9 of the drawings. As in FIGURES 1 through 7, the crystal 80 is a full Y cut or rotated Y cut crystal in which the dominant mode is excited by body shear having a vibratory portion 82 on which are mounted sets of opposed electrodes. One of each set of electrodes is shown at 84 and 86, it being understood that complementary, coextensive electrodes are mounted opposite to these on the other side of the beam. The crystal 80 is cut out along portions 88 and 90 and the vibratory portion 82 of the crystal is reduced in its width as shown in FIGURE 8. Thus, a pair of nodal lines 92 and 94 are formed, about which the beam vibrates in a free-free mode as indicated in FIGURE 9 of the drawings. The crystal 80, in a manner similar to the crystals described hereinabove, may be placed in axial tension or compression applied to the end portions thereof which translate such forces to the nodal sections 90 and 92 to affect the frequency of vibration of the vibratory portion 82. It is to be understood, of course, that the electrodes 84 and 86 and the complementary electrodes on the other side of the vibratory member 82 have suitable electrical connections, not shown, made thereto for applying alternating electrical potentials and establishing oppositely directed electrical fields through the vibratory members except at times during zero crossover of the alternating potentials to maintain beam vibration.

Referring now to FIGURES 10 and 11 of the drawings, illustrating another embodiment of this invention, a piezoelectric crystal member 96 is provided which has an intermediate reduced portion 98 thereof forming a vibratory beam similar to the vibratory beam 16 of the crystal 10 shown in FIGURE 1 of the drawings. In FIGURE 10, however, the vibratory beam 98 does not have applied thereto sets of opposed electrodes but rather oppositely directed longitudinally spaced electric fields are established in the vibratory beam 98 by the sets of electrodes 100–102 and 104–106. These electrodes are mounted in spaced relation with respect to the beam 98 and are supported by a fixed member 108 shown more clearly in FIGURE 11 of the drawings. The electrodes 100 through 106 are connected to electrical leads extending to the output of an electrical oscillator circuit, not shown, wherein the electrodes 100 and 106 are connected to the lead 110 and the electrodes 102 and 104 are connected to the lead 112. In a manner entirely similar to that described hereinabove with respect to FIGURES 1 and 2 through 6 of the drawings, the alternating, oppositely directed, longitudinally spaced electric fields through the vibratory beam 98 are effective to cause the member to vibrate at its natural frequency under electrical excitation. Also, the beam 98 is responsive to axially directed forces to change the frequency of vibration of the beam; compressive forces reducing the natural frequency of vibration and tensile forces increasing the natural frequency of vibration.

The supporting member 108 is made of insulating material and preferably has a slot 109 therein to form a U-shaped member which is effective in receiving the beam 98 and the electrodes 100 through 106 are closely disposed to the vibrating beam 98, however, being spaced far enough away from it so that it does not touch the electrodes in its vibrations.

The digital force transducers as described hereinabove may find practical application in an accelerometer according to this invention and as shown in FIGURE 12 of the drawings. As shown in this figure, a frame or enclosure 114 has supported therein a pair of seismic masses 116 and 118 which are secured to the frame 114 by respective hinge members 120 and 122. Each of the hinge members is reduced along a portion thereof as shown at 124 and 126, respectively, to facilitate a swinging or pendulous motion of the mass in a vertical direction as seen in this figure. The pendulous motion of the masses 116 and 118 are restrained by the respective digital force transducers 128 and 130 which are constructed in accordance with this invention and may be similar to any one of the embodiments described hereinabove. The digital force transducers are secured at one end to the corresponding seismic mass and at the other end to a wall of the enclosure 114. The axial direction of the digital force transducers is also vertical which thus, is the direction of the sensing axis of the accelerometer.

It is noted that the digital force transducers 128 and 130 are secured to opposite walls of the enclosure 114. As a consequence, an acceleration or deceleration along the acceleration axis 132 is effective to apply opposing forces to the respective digital force transducers. As an example, in response to an acceleration upwardly as seen in this figure, the digital force transducer 128 has applied thereto a compressive force and the digital force transducer 130 has applied thereto a tensile force.

The electrodes of the digital force transducers 128 and 130 are electrically excited by respective bridge type oscillator circuits shown at 134 and 136. It is a characteristic of bridge oscillator circuits to "follow" the natural frequency of vibration of the vibrating beams of the force transducers 128 and 130 and thus, as the frequency of vibration of these digital force transducers is effected by the acceleration forces applied thereto, the bridge oscillator circuits also change their frequencies of operation. As seen in FIGURE 12 of the drawing, the respective frequencies of operation of these circuits are represented by $f_1$ and $f_2$. The outputs of these circuits are applied to a mixer circuit 138, the output of which may be the difference between these frequencies or in other words, $f_1-f_2$.

In the accelerometer of FIGURE 12, the resonant frequency of each transducer is a function of the applied acceleration and in accordance with the formula $f_n=f_0(1+CMa)^{1/2}$ wherein M=the inertia mass, $a=$ applied acceleration, and C is a suitable constant. For a single beam, the output frequency is given by the expression:

$$f=C_0(1+C_1F)^{1/2}$$

wherein $f$=natural frequency of beam vibration $C_0$ and $C_1$ are constants, which are a function of beam material, dimensions and methods of support $F$=axially applied force, tensile or compressive The power series expansion for the natural frequency of the first beam is then:

$$f_1=f_{01}+K_{11}F-K_{21}F^2+K_{31}F^3$$

For two beams in push-pull, the frequency of the second beam is:

$$f_2=f_{02}-K_{12}F-K_{22}F^2-K_{32}F^3$$

The difference between the two frequencies, $f_d$, assuming matched coefficients, is:

$$f_d=f_1-f_2=(K_{11}+K_{12})F+(K_{31}+K_{32})F^3$$

or $$F_d=2K_1F+2K_3F^3$$

In the accelerometer, the applied force is produced by the action of the force transducer in accelerating the proof mass, M, at the same rate as the frame, to which the acceleration $a$, has been applied. Thus, $$F=Ma$$

and $$f_d=2K_1(Ma)+2K_3(Ma)^3$$

While the present invention has been described in preferred embodiments, it will be obvious to those skilled in the art that various modifications can be made therein within the scope of the invention, and it is intended that the appended claims cover all such modifications.

What is claimed is:

1. A force transducer comprising a beam of piezoelectric material supported at its respective ends, means for establishing oppositely directed alternating electric fields transversely of the beam and applied at longitudinally spaced locations means for alternating the direction of said fields to cause said beam to vibrate longitudinally at its characteristic natural frequency, and means for applying compressive and tensile forces axially and longitudinally along said beam whereby the natural frequency of vibration of said beam is varied accordingly.

2. A force transducer according to claim 1 wherein said piezoelectric material is alpha quartz and said beam forms a Y-cut crystal whereby electric fields transverse to the beam impose a body shear strain therein.

3. A force transducer according to claim 1 wherein the means for establishing the electric fields therein includes a pair of opposed conductive coatings at longitudinally spaced locations of said beam and means for applying opposed electrical alternating potentials to opposed pairs of coatings.

4. A force transducer according to claim 1 wherein the means for establishing said electric fields comprises pairs of conductive plates, the plates of each pair being on opposite sides of said beam and spaced therefrom and substantially coextensive with projections of each other.

5. A force transducer according to claim 2 wherein the Y-axis of the beam is along the transverse dimension thereof.

6. A force transducer according to claim 2 wherein the crystallographic axes of the beam are oriented to effect body shear strain in the beam in response to electric fields along said axis.

7. A force transducer according to claim 1 wherein said means for applying tensile and compressive forces includes enlarged end portions at respective end of said beam each having a transversely reduced portion forming a hinge, said hinge assuring that only forces aligned along the longitudinal axis of said beam are transmitted thereto.

8. A force transducer according to claim 7 wherein said end portions are integral with said beam.

9. A force transducer according to claim 7 wherein said end portions are discrete and secured to respective ends of said beam.

10. A force transducer according to claim 1 wherein said beam is reduced in width along a portion intermediate its ends and wherein U-shaped portions of the beam are removed at portions between respective ends and said reduced portions are wherein said U-shaped portions are concave toward said reduced portion to provide nodal lines about which portions of said beam deflect.

11. An accelerometer according to claim 1 wherein said means for alternating the electric fields includes bridge circuit type oscillators.

References Cited

UNITED STATES PATENTS

| | | | |
|---|---|---|---|
| 2,795,134 | 6/1957 | Weber | 73—141 |
| 3,307,409 | 3/1967 | Newton | 73—505 |
| 3,411,348 | 11/1968 | Schultheis | 73—141 |
| 1,866,267 | 7/1932 | Nicolson | 310—8.4 |
| 2,488,586 | 11/1949 | Diemer | 310—8.4 |
| 2,880,333 | 3/1959 | Dranetz | 310—8.4 |
| 2,984,111 | 5/1961 | Kritz | 310—8.4 |
| 3,093,760 | 6/1963 | Tarasevich | 73—517 |
| 3,190,129 | 6/1965 | Kritz | 73—517 |
| 3,241,373 | 3/1966 | Ricketts | 73—503 |
| 3,354,426 | 11/1967 | Massa | 310—8.5 |
| 3,304,773 | 2/1967 | Rogallo | 73—141 |
| 3,402,601 | 9/1968 | Heineman | 73—141 |
| 3,303,452 | 2/1967 | Booth | 73—141 |

J. D. MILLER, Primary Examiner

U.S. Cl. X.R.

73—141, 517; 310—8.1, 8.7, 9.6, 9.7